(12) United States Patent
Camilus et al.

(10) Patent No.: US 11,080,533 B2
(45) Date of Patent: Aug. 3, 2021

(54) SURVEILLANCE SYSTEM WITH HUMAN BEHAVIOR PREDICTION BY HUMAN ACTION RECOGNITION

(71) Applicant: Sensormatic Electronics, LLC, Boca Raton, FL (US)

(72) Inventors: Santle Camilus, Bangalore (IN); Manjuprakash Rama Rao, Bangalore (IN)

(73) Assignee: Sensormatic Electronics, LLC, Boca Raton, FL (US)

( * ) Notice: Subject to any disclaimer, the term of this patent is extended or adjusted under 35 U.S.C. 154(b) by 79 days.

(21) Appl. No.: 15/967,983

(22) Filed: May 1, 2018

(65) Prior Publication Data
US 2018/0314897 A1 Nov. 1, 2018

(30) Foreign Application Priority Data
May 1, 2017 (IN) .............................. 201741015321

(51) Int. Cl.
| | | |
|---|---|---|
| *G06K 9/00* | (2006.01) | |
| *H04N 7/18* | (2006.01) | |
| *G08B 21/02* | (2006.01) | |
| *G06K 9/62* | (2006.01) | |
| *G08B 31/00* | (2006.01) | |
| *G08B 13/196* | (2006.01) | |
| *G06K 9/46* | (2006.01) | |

(52) U.S. Cl.
CPC ..... *G06K 9/00771* (2013.01); *G06K 9/00335* (2013.01); *G06K 9/00718* (2013.01);
(Continued)

(58) Field of Classification Search
CPC ..... G06K 2009/00738; G06K 9/00335; G06K 9/00718; G06K 9/00771; G06K 9/4628; G06K 9/6262; G06K 9/6269; G06K 9/6274; G06K 2209/40; G06K 9/00744; G08B 13/19613; G08B 13/19615; G08B 13/19641; G08B 13/19645; G08B 21/02; G08B 31/00; H04N 7/18; H04N 7/181; G06F 16/7837; G06F 16/73; G06F 16/78; G06N 5/046; B25J 9/1676; G05B 2219/40202; G05B 2219/40203;
(Continued)

(56) References Cited

U.S. PATENT DOCUMENTS

| | | | | |
|---|---|---|---|---|
| 2011/0182469 A1* | 7/2011 | Ji | ........................ | G06K 9/4628 382/103 |
| 2014/0192206 A1* | 7/2014 | Holz | .................. | H04N 5/23241 348/169 |

(Continued)

OTHER PUBLICATIONS

He, K., et al., "Deep residual learning for image recognition," 1-12: (Dec. 2015).

(Continued)

*Primary Examiner* — Xin Jia
(74) *Attorney, Agent, or Firm* — HoustonHogle LLP

(57) ABSTRACT

The present invention concerns surveillance systems that flag the potential threats automatically using intelligent systems. It can then notify or automatically alert the security personnel of impending dangers. Such a system can lower the cognitive load on the security personnel and can assist them to bring to prioritize their attention to potential threats and thereby improve the overall efficiency of the system. There could also be savings in labor cost.

20 Claims, 1 Drawing Sheet

(52) U.S. Cl.
CPC ......... *G06K 9/4628* (2013.01); *G06K 9/6262* (2013.01); *G06K 9/6269* (2013.01); *G06K 9/6274* (2013.01); *G08B 13/19613* (2013.01); *G08B 13/19615* (2013.01); *G08B 13/19641* (2013.01); *G08B 13/19645* (2013.01); *G08B 21/02* (2013.01); *G08B 31/00* (2013.01); *H04N 7/18* (2013.01); *H04N 7/181* (2013.01); *G06K 2009/00738* (2013.01)

(58) Field of Classification Search
CPC ......... G06T 15/205; G06T 2207/30196; G06T 2207/30232; G06T 7/292; G06T 7/564; G06T 7/77
See application file for complete search history.

(56) References Cited

U.S. PATENT DOCUMENTS

| | | | | |
|---|---|---|---|---|
| 2015/0294496 | A1* | 10/2015 | Medasani | H04N 7/181 348/159 |
| 2018/0012463 | A1* | 1/2018 | Chaudhry | H04N 7/181 |
| 2018/0035082 | A1* | 2/2018 | Patil | G06T 7/246 |
| 2018/0089493 | A1* | 3/2018 | Nirenberg | A61F 9/08 |
| 2018/0253839 | A1* | 9/2018 | Zur | A61B 1/31 |
| 2018/0300557 | A1* | 10/2018 | Rodenas | G06K 9/00711 |

OTHER PUBLICATIONS

Kotsiantis, S.B., "Supervised machine learning: A review of classification techniques," Informatica, 31(3): 249-268 (2007).
LeCun, Y., et al., "Deep learning." Nature, 521(7553): 436-444 (2015).
Simonyan, K. et al., "Very Deep Convolutional Networks for Large-Scale Image Recognition," 1-14 (2014).
Szegedy, C., et al., "Going deeper with convolutions," in IEEE Conference on Computer Vision and Pattern Recognition (CVPR), 1-9 (2015).
Tran, D. et al., "Learning spatiotemporal features with 3D convolutional networks," 1-16. (Oct. 2015).
Ji, S., et al., "3D Convolutional Neural Networks for Human Action Recognition," NEC Laboratories America, Inc., 1-8 (2010).

* cited by examiner

SURVEILLANCE SYSTEM WITH HUMAN BEHAVIOR PREDICTION BY HUMAN ACTION RECOGNITION

RELATED APPLICATIONS

This application claims priority to Indian Application No. 201741015321, filed on May 1, 2017, which is incorporated herein by reference in its entirety.

BACKGROUND OF THE INVENTION

Video surveillance is widely used in public places such as airports, bus stations, shopping malls in order to ensure public safety. The number of cameras being monitored depends on the area of coverage. As the monitoring load increases to the security personnel the human fatigue factor is likely to influence the loss of efficiency. Often security incidents are noticed only after they occur.

SUMMARY OF THE INVENTION

The present invention concerns surveillance systems that flag the potential threats automatically using intelligent systems. It can then notify or automatically alert the security personnel of impending dangers. Such a system can lower the cognitive load on the security personnel and can assist them to bring to prioritize their attention to potential threats and thereby improve the overall efficiency of the system. There could also be savings in labor cost.

Other uses exist, however. For example, in the retail environment, the system is used to detect customer when they fall (slip and fall) in retail store surveillance camera image data. In several instances retail stores are being sued as consequence of both genuine and fake fall incidents. Detection of a person fall event in image data feeds and indexing the time of occurrences of these would assist retail stores to verify the claims and provide evidence to insurance and other authorities. It could also be used in the surveillance for human behavior prediction. For example, human behavior prediction is important to identify any vulnerable situation ahead of time. This would help to prevent the incident happening. Still another example is confirming whether there is adequate hygiene and handwashing. One of the requirements in hospitals is that health care personnel should wash their hands with sanitizing solution/soap after performing medical procedure. Recognition of action such as hand washing using depth sensors mounted on body worn camera could help to protect privacy as well enforce compliance. In this example three dimensional convolutional neural network is trained using a sequence of images. The resultant model is more accurate as it learns handwashing action by using depth, spatial and time information.

The inventive surveillance systems employ video analytics strategies to predict and possibly even avoid incidents before they happen. This is possible by predicting human behaviors and their intent by analyzing their actions over a period of time utilizing the videos captured by surveillance cameras.

The surveillance systems analyze human actions in a video and audio feeds to obtain insights on their intentions. Recent advances have drastically improved the accuracy, performance and scaling of video analytics. The surveillance systems utilize high definition cameras, potentially cloud computing infrastructure, computing power based on graphic processing units (GPUs) and image processing accelerators, and high bandwidth connectivity The system thus distribute video analytic functions from network edge to the cloud. The system employ deep learning approaches based on deep learning toolkits such as Caffe, Tensor flow, Theano, Torch. The system is trained on public repositories and through sensors.

In general, according to one aspect, the invention features, a system and method for analyzing image data from surveillance cameras that uses neural networks to identify potentially harmful activities.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present surveillance system is trained to distinguish between harmful and benign human actions. Examples of benign actions include sleeping to walking to running to other similar activity. The system recognizes harmful actions—thereby predicting behaviors especially vulnerable intents.

Figure 1:
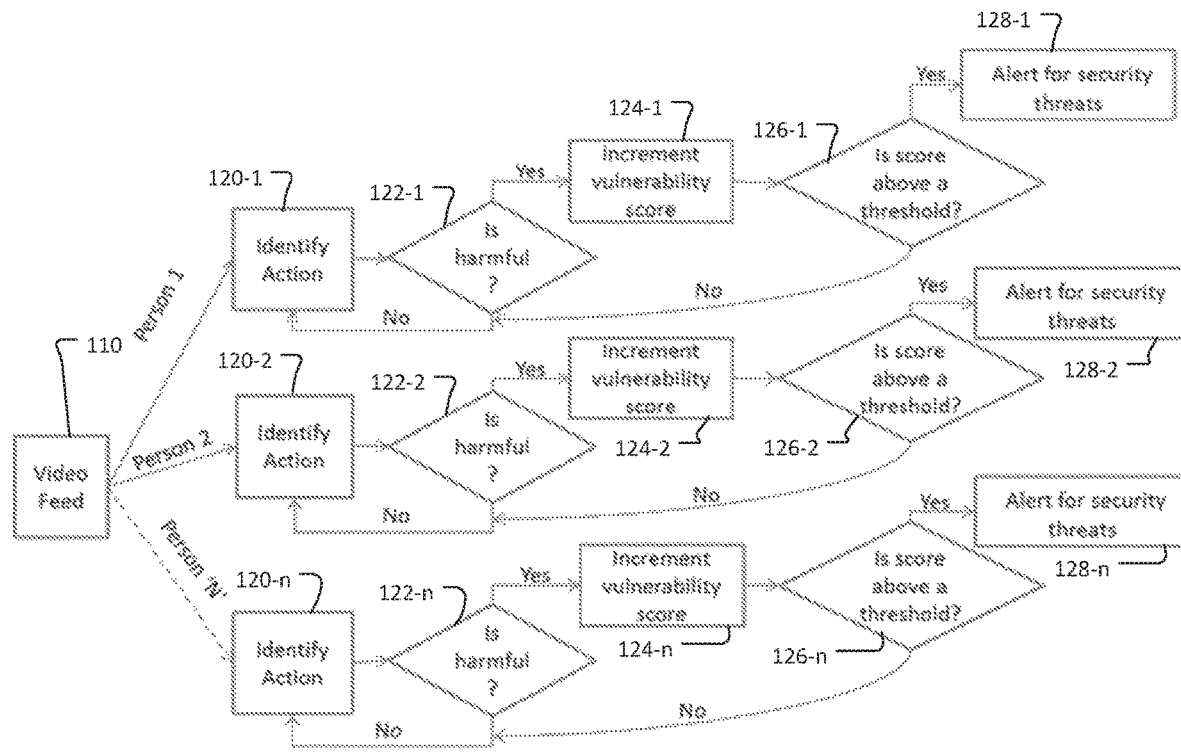
FIG. 1 is a flow diagram showing behavior prediction for a system according to the present invention.

FIG. 1 illustrates the design of the system. Every person, person 1, person 2 . . . person n, of a scene provided in a video feed 110 is identified on surveillance feeds is monitored by a software solution. Individual's actions are recognized time to time in an action identification step 120-1, 120-n. If the action is determined to be harmful in steps 122-1, 122-n, then, based on the action type, the person's vulnerability score is updated in steps 124-1, 124-n. If the actions are unusual or dangerous, say for example pushing a man, hitting a man, taking a gun out, taking a knife out, his vulnerability score is increment. If the person's activity score is above a threshold as determined in step 126-1, 126-n, the video observations are informed to control rooms for further actions in steps 128-1, 128-n. There could be other applications for human action recognition. For instance there are several instances of fake slip and fall insurance claims which is a concern to retailers. It would be possible to detect and report falls in the video feeds at a retail store which would help in incident management and serve as a reference for insurance related investigations.

Figure 2:
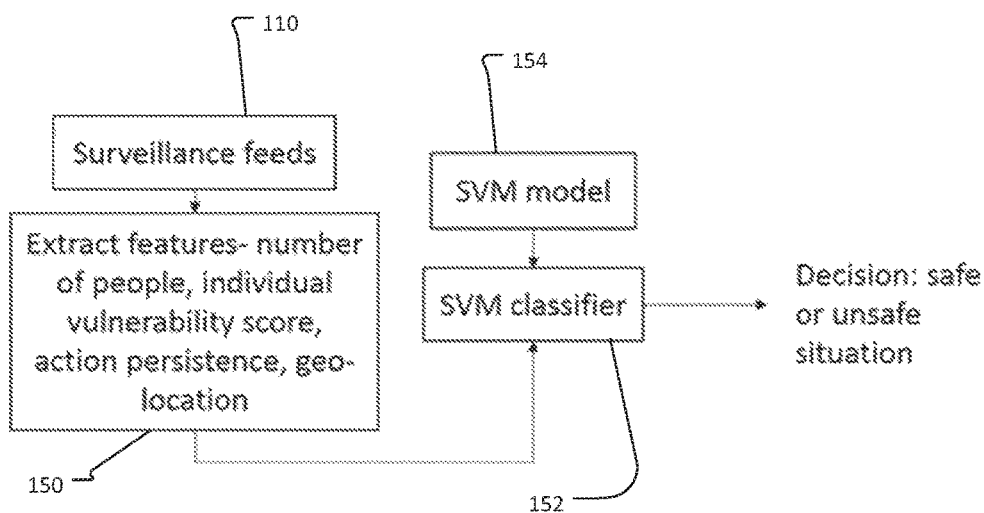
FIG. 2 is a block diagram and flow diagram also illustrating its operation.

FIG. 2 shows how the system might be implemented. Specifically, the surveillance feeds 110 are analyzed in step 150. Specifically features such as the number of people in the surveillance feeds, individual vulnerability scores determined for each of those individuals, action persistence information, and geolocation are all analyzed. This information is provided to an Support Vector Machine (SVM) classifier 152 that applies the SVM model 154. The result is a decision is it is safe or unsafe situation.

The threshold(T) is a SVM classifier decision. "T" is based the analysis of earlier example videos—a large number of previous positive and negative vulnerabilities are used for the purpose. From these videos, actions are extracted and their scores are fed into the SVM classifier and based on the vulnerability label, the SVM is trained. After deployment, the SVM classifier make a decision.

The size of the convolutional filters is important along with the number of filters. This architecture is decided by us based on our experimentation with the constraint of achieving higher accuracy and lower run time. The closest match of this architecture is described in [8]. This paper has 8 convolution layers and 2 fully connected layer. Our architecture has 3 convolution layers and 1 fully connected layer. The reduction in layers is to achieve higher speed and the filter sizes are also different which is set in our case to achieve higher accuracy.

Most vital part of behavior prediction is Human Action Recognition (HAR). HAR deals with recognizing human activities such as running, sitting, standing, falling, pushing a man, hitting a man, taking a gun out, keeping a knife, etc. on videos using a digital device. Possibly a single person or multi-person (several individuals with no common aim) or a group of people (friends or relatives with a common aim) could involve. HAR is a challenging task due to cluttered background, occlusion, variation in postures, illuminations and wearables, camera view-points and so on. HAR is a nonlinear programming problem that demands the deployment of supervised machine learning techniques [1] than applying unsupervised methods [2]. Also, typical supervised machine learning techniques like Support Vector Machines [1] or Adaboost [3], or Decision Trees [1], may not be effective as they typically use engineered features that lack robust physiological basis. It is hard to make these conventional methods more general to solve real world problems of HAR as it is unknown in prior which features are vital for the task in the hand. As an outcome of our analyses, we have chosen to solve this problem by Convolutional Neural Networks [4] (CNNs, otherwise called as deep learning networks) that are supervised machine learning methods having self-learnable filters that could model simple features, edges, to intermediate features, textures, to complex features, objects. Also these methods have proven to be more effective to the extent of receiving commercial successes in image classification and voice recognition tasks. Most CNN methods, to name a few GoogleNet [5], ResNet [6], and VGG-16 [7], in their base form are targeted for single-image based applications. HAR is slightly a bigger problem that needs a method that uses temporal information in addition to spatial information.

Human Action Recognition

TABLE 1

CNN Parameters

| Parameter | Value |
| --- | --- |
| Update method | Stochastic gradient descent (SGD) with momentum |
| Learning rate | $1 \times 10^{-5}$ |
| Number of epochs | 100 |
| Learning rate decay | 50 epochs |
| Dropout | 0.5 |
| Regularization | $1 \times 10^{-5}$ |

3.1 Proposed Method

We propose a 3D-CNN to solve the HAR problem as it can model spatial as well as temporal information by learning subject movement and deformation over time. We adopt our CNN framework from the work of [8] and make key modifications to it for improving accuracy and run time. The CNN has 3 convolution layers, 2 max polling layers and one fully connected layer for detecting walk and run as targeted actions for validating the concept. Also, obtaining training and testing images for walking and running is relatively easier than obtaining for vulnerable actions. However, without affecting the generality, the same CNN network could be used for recognizing vulnerable actions such as taking a gun out, pushing a person and so on. The CNN network was implemented in Theano. In the CNN, we use the parameters as listed in Table 1. We provide 16 frames at a time to model temporal information and use a biased training data that has walking and running video frames in the ratio of 1:3 to model the human walking pattern. We captured around 45 minutes of running videos coving over 72 subjects and over 2 hours of walking videos in the vicinity of Bangalore Johnson Controls campus. These videos were being used for training and testing of the 3D-CNN. To validate our method, we used 171 running, 229 walking videos as training data and 30 running, 30 walking videos as testing data. The run time is reported in Table 2. Use of CPUs' enhances the speed of execution.

TABLE 2

| Platform | Platform description | Number of GPU cores | Run Time (Frames per second) |
| --- | --- | --- | --- |
| Personal Computer | Intel i5, 3.2 GHZ | 1024 | 24 |
| Embedded device | NVIDIA Jetson TX1 | 256 | 10 |

The accuracy of correctly recognizing the actions is found to be 84% (Table 3). A sample result is provided in FIG. 5. The network has been ported on an embedded device. The results show a run time speed of 10 frames per second and this is encouraging towards executing the method on an edge device in real time.

| Version | Accuracy (Percent) |
| --- | --- |
| Vanilla | 84% |
| Transfer learning | 89% |

Realization of Transfer Learning

Teaching a CNN with general image features is important to improve its accuracy. We use a pre-trained model of 487 classes of actions trained on sports-1 million data base [9] and we replace the final classification layer with 2 classes that we require for running and walking classification. The final layer of the network is trained again with our own running and walking images. By this way, the network has seen many images and their association with corresponding actions. This helps the network to generalize its model and avoid overfitting. The network has achieved an accuracy improvement of 5% percent on the tested data after transfer learning. By this way, we show that transfer learning favors improving accuracy of our method.

Vulnerability Prediction

The type of action and duration of it decide vulnerability level. Some harmful actions can be coincidental, say running in a building; however an action such as running followed by taking a gun out is not. We propose a method to predict vulnerability by identifying types of action and their duration of occurrence. We categorize actions into following types: (1) safe (2) lesser safe and (3) unsafe. List of some example actions are shown in Table 4.

TABLE 4

| Types of Action | | |
| --- | --- | --- |
| Safe Actions | Lesser Safe Actions | Unsafe Actions |
| Typing | Running | Throwing objects |
| Writing on board | Jumping | Climbing building |
| Drumming | Falling | Taking a gun out |
| Playing Guitar | Shivering | Pointing a gun |
| Playing Piano | Angriness | Carrying sharp objects |
| Billiard | Shouting | Hitting a man |
| Bowling | Abrupt movements | Fighting |
| Eating | Staring | Hiding |

A Safe Action (SA) is a typical action that has the score of zero. A Lesser Safe Action (LSA) has the score of 10% of an unsafe action, while the Unsafe Action (UA) has the maximum score. Let the corresponding occurrence count respectively be RSA, RLSA, and RUA. The Vulnerability Prediction Score (VPS) is measured as $VPS = RSA \times SA + RLSA \times LSA + RUA \times UA$ VPS is a weighted function of action type and its repetition. If VPS is over a Threshold (T), the behavior is predicted as vulnerable. T is decided based on earlier example videos—a large number of previous positive and negative vulnerabilities are used for the purpose. From these videos, actions are extracted and their scores are fed into a Support Vector Machine (SVM) classifier and based on the vulnerability label, the SVM is trained. During testing, if VPS gets updated to a new value, it is passed to the SVM model for prediction of vulnerable behavior.

Deployment Directions

Having provided an approach to prediction of human vulnerable actions, there is a need to discuss potential deployment scenarios. As described, creation of human action recognition models requires extensive set of videos and computing resources in order to train the model. The model can be trained offline in cloud computing platforms. However the trained model may be deployed at various points in the network based on the required scale. For instance the model may be deployed on an Internet Protocol (IP) camera with sufficient computing power to run the model or the feeds of a few IP cameras may be aggregated at a gateway which can be provisioned with relatively higher computing power. For even higher scale of deployment a server or a cloud based service model may be feasible.

There are opportunities to incorporate the HAR models into the exiting product offerings. As an example the existing Video Content Analysis (VCA) engine offered as a part of the Video-edge security products can be enhanced by integrating the HAR models. The existing VCA creates metadata on object tracking, object detection and classification. The metadata, can be leveraged by the HAR models in order to extract localized Region of Interests (ROIs) so that the accuracy can be improved. In addition, this provides an opportunity to optimize the processing requirements. The alerts generated by the HAR module may be further integrated with VSaaS offerings. Suitable bounding boxes can be rendered for ready referencing by video monitoring operators.

Conclusion

We have presented a human behavior prediction method for vulnerability detection on the videos of surveillance cameras. It finds its use in securing buildings in an automated and cost-effective way. The novelty of this method is a proposal to use action recognition for predicting vulnerabilities, use of a variant of 3D-CNN for action recognition and a new method for vulnerability prediction score estimation through categorizing actions. The action recognition method uses both spatial and temporal information. The method was evaluated on two actions and found to be accurate on 89% of cases. Transfer learning shows reasonable improvement upon the accuracy and the method could run at 10 frames per second in an embedded device that has 256 GPU cores. By skipping every 2 frames, without sacrificing on the accuracy the method could run at 30 FPS i.e. at video rate. Identification of unsafe actions of a person over a period time contributes to quick prediction of his vulnerable behavior. To avoid false positives, the vulnerability term is defined as a function of time and action type. At the end, we have discussed the deployment and possible use case scenarios.

While this invention has been particularly shown and described with references to preferred embodiments thereof, it will be understood by those skilled in the art that various changes in form and details may be made therein without departing from the scope of the invention encompassed by the appended claims.

REFERENCES

[1] S. B. Kotsiantis, "Supervised machine learning: A review of classification techniques," *Informatica*, vol. 31, no. 3, 2007.
[2] Richard Duda, Peter Hart, David Stork, "Unsupervised Learning and clustering", *Pattern classification* (2nd ed.), 2001. Wiley, ISBN 0-471-05669-3.
[3] Y. Freund and R. Schapire, "A decision-theoretic generalization of on-line learning and an application to boosting," in Computational Learning Theory, Lecture Notes in Computer Science, Springer, vol. 904, pp. 23-37, 1995.
[4] Y. LeCun, Y. Bengio, and G. Hinton, "Deep learning." Nature, vol. 521, no. 7553, pp. 436-444, 2015.
[5] C. Szegedy, W. Liu, Y. Jia, P. Sermanet, S. Reed, D. Anguelov, D. Erhan, V. Vanhoucke, and A. Rabinovich, "Going deeper with convolutions," in IEEE Conference on Computer Vision and Pattern Recognition (CVPR), June 2015, pp. 1-9
[6] K. He, X. Zhang, S. Ren, and J. Sun, "Deep residual learning for image recognition," December 2015. Available: http://arxiv.org/ab/512.03385
[7] Simonyan and Zisserman, "Very Deep Convolutional Networks for Large-Scale Image Recognition", 2014. Available: http://www.robots.ox.ac.uk/~vgg/research/very_deep
[8] D. Tran, L. Bourdev, R. Fergus, L. Torresani, and M. Paluri, "Learning spatiotemporal features with 3D convolutional networks," October 2015. Available: http://arxiv.org/abs/1412.0767
[9] Andrej Karpathy, George Todetici, Sanketh Shetty, Thomas Leung, Rahul Sukthankar and Li Fei-Fei, "Large-scale Video Classification with Convolutional Neural Networks", in IEEE Conference on Computer Vision and Pattern Recognition (CVPR), 2014.

What is claimed is:

1. A method for analyzing surveillance data from a surveillance system, the method comprising:
a neural network recognizing actions performed by one or more individuals based on analyzing surveillance feeds from the surveillance system;
a support vector machine (SVM) classifier categorizing the recognized actions as having a type of safe, less safe, or unsafe and generating vulnerability scores indicating whether the recognized actions are determined to be harmful or unusual based on the types of the recognized actions, duration of the recognized actions, and sequences of recognized actions of different types; and
generating alerts in response to determining that the vulnerability score is above a predetermined threshold.

2. The method of claim 1, further comprising the neural network determining features of the surveillance feeds including quantity of individuals, action persistence information, and geo-location information.

3. The method of claim 1, wherein the neural network is a three-dimensional convolutional neural network (3D-CNN) for learning subject movement and deformation over time to model spatial and temporal information from the surveillance video feeds.

4. The method of claim 3, wherein the 3D-CNN has three convolution layers, at most two polling layers, and one fully connected layer.

5. The method of claim 3, wherein the 3D-CNN is provided 16 frames of video data at a time to model temporal information.

6. The method of claim 3, further comprising training the 3D-CNN to recognize actions using a pre-trained model of classes of actions.

7. The method of claim 3, further comprising the 3D-CNN using a biased training data that has walking and running video frames in the ratio of 1:3 to model the human walking pattern.

8. The method of claim 1, further comprising generating the predetermined threshold based on the SVM classifier recognizing actions from example videos labeled with positive or negative vulnerability scores.

9. The method of claim 1, wherein the safe actions include typing, writing, drumming, playing musical instruments, playing games, and/or eating, the less safe actions include running, jumping, falling, shivering, demonstrating anger, shouting, abrupt movements, and/or staring, and the unsafe actions include throwing objects, climbing a building, taking out a gun, pointing a gun, carrying sharp objects, hitting other individuals, fighting, and/or hiding.

10. The method of claim 1, wherein scores for safe actions (SA) have a value of zero, scores for unsafe actions (UA) have a predetermined maximum value, and scores for the lesser safe actions (LSA) have values of 10% of the predetermined maximum value.

11. The method of claim 10, further comprising generating the vulnerability score (VPS) based on the scores SA, UA, and LSA and a number of occurrences of safe actions (RSA), a number of occurrences of less safe actions (RLSA), and a number of occurrences of unsafe actions (RUA), wherein the VPS=RSA×SA+RLSA×LSA+RUA×UA.

12. The method of claim 1, wherein the neural network and/or the SVM classifier execute on surveillance cameras of the surveillance system.

13. The method of claim 12, wherein the neural network executes on the surveillance cameras in real time with a run time speed of at least 10 frames per second.

14. The method of claim 1, wherein the neural network and/or the SVM classifier execute on graphical processing units of devices of the surveillance system.

15. The method of claim 1, wherein the neural network and/or the SVM classifier execute on a gateway of the surveillance system with higher computing power than surveillance cameras of the surveillance system, wherein the gateway aggregates the surveillance feeds from a plurality of the surveillance cameras.

16. The method of claim 1, wherein the neural network and/or the SVM classifier execute on a server or cloud-based service system.

17. The method of claim 1, further comprising generating the vulnerability score (VPS) based on scores for safe actions (SA), scores for unsafe actions (UA), scores for lesser safe actions (LSA), a number of occurrences of the safe actions (RSA), a number of occurrences of the less safe actions (RLSA), and a number of occurrences of the unsafe actions (RUA).

18. The method of claim 17, wherein the scores for the safe actions (SA) have a predetermined minimum value, the scores for the unsafe actions (UA) have a predetermined maximum value, and the scores for the lesser safe actions (LSA) have values of a predetermined percentage of the predetermined maximum value.

19. The method of claim 18, wherein the PS=RSA×SA+RLSA×LSA+RUA×UA.

20. A system for analyzing surveillance data from a surveillance system, the system comprising:

a neural network for recognizing actions performed by one or more individuals based on analyzing surveillance feeds from the surveillance system; and a support vector machine (SVM) classifier for categorizing the recognized actions as having a type of safe, less safe, or unsafe and generating vulnerability scores indicating whether the recognized actions are determined to be harmful or unusual based on the types of the recognized actions, duration of the recognized actions, and sequences of recognized actions of different types and for generating alerts in response to determining that the vulnerability score is above a predetermined threshold.

* * * * *